United States Patent
Anderson et al.

(10) Patent No.: US 10,258,530 B1
(45) Date of Patent: Apr. 16, 2019

(54) VAULT LOWERING DEVICES AND METHODS

(71) Applicant: Advanced Funeral Source, LLC, Greenville, SC (US)

(72) Inventors: Boyd Anderson, Greenville, SC (US); Ron Creech, Greenville, SC (US)

(73) Assignee: Advanced Funeral Source, LLC, Greenville, SC (US)

( * ) Notice: Subject to any disclaimer, the term of this patent is extended or adjusted under 35 U.S.C. 154(b) by 0 days.

(21) Appl. No.: 16/057,123

(22) Filed: Aug. 7, 2018

(51) Int. Cl.
*A61G 19/00* (2006.01)
*F16H 37/02* (2006.01)

(52) U.S. Cl.
CPC ............. *A61G 19/00* (2013.01); *F16H 37/02* (2013.01)

(58) Field of Classification Search
CPC ........ A61G 19/00; E04H 13/001; F16H 37/02
USPC ......................................... 27/32-34; 74/457
See application file for complete search history.

(56) References Cited

U.S. PATENT DOCUMENTS

| | | | | |
|---|---|---|---|---|
| 2,762,106 A | * | 9/1956 | Wilkirson | A61G 19/00 27/32 |
| 3,086,621 A | * | 4/1963 | Dale | A61G 19/00 188/271 |
| 4,413,390 A | * | 11/1983 | Blaese | A61G 19/00 27/32 |
| 4,716,636 A | * | 1/1988 | Schneider | A61G 19/00 27/32 |
| 2009/0260204 A1 | * | 10/2009 | Courchesne | A61G 19/00 27/32 |
| 2012/0084953 A1 | * | 4/2012 | Herridge | A61G 19/00 27/32 |

* cited by examiner

*Primary Examiner* — William L Miller
(74) *Attorney, Agent, or Firm* — Nelson Mullins Riley & Scarborough LLP

(57) ABSTRACT

A vault lowering aid comprising a housing; an elongated member; a drive shaft; a drive sprocket disposed within the housing and engaged with the draft shaft, such that a rotation of the draft shaft causes a rotation of the drive sprocket; at least one driven sprocket disposed within the housing and engaged with the drive sprocket via a chain, wherein the chain enables the rotation of the drive sprocket to cause a rotation of the driven sprocket; a driven shaft, wherein the driven shaft is engaged with the driven sprocket, such that the rotation of the driven sprocket causes the rotation of the driven shaft, and wherein the driven shaft is configured to engage a vault lowering device geared box; and at least one guide mechanism configured to secure the vault lowering aid on the geared box.

20 Claims, 7 Drawing Sheets

(Prior Art)

Prior Art

US 10,258,530 B1

VAULT LOWERING DEVICES AND METHODS

FIELD OF THE INVENTION

The subject matter herein relates generally to devices and methods for lifting and lowering a vault.

BACKGROUND

Caskets have traditionally been employed for burial of the dead. Often the casket is secured in a vault prior to burial. A vault lowering device, also referred to as a vault jack, typically has two pairs of corner posts and a rotating shaft which connects each pair of corner posts on the shorter of the vault sides. Each of the rotating shafts include a pair of cable spools. A cable is run from each cable spool on one end of the vault, under the vault, and is connected to a respective cable spool on the other end rotating shaft. At least two of the corner posts are also connected by a rotating shaft along the longer side of the vault. At least one of these corner posts accepts a removable handle which, when rotated, imparts rotation to the longer shaft and the two end rotating shafts and the cable spools, thereby raising or lowering the vault.

This conventional process of raising or lowering the vault requires a great deal of force to rotate the handle and raise the vault. The process can be time consuming and physically taxing on the individuals responsible for operation of the vault lowering device. Additionally, as vaults are lowered into a grave, the handle may be removed in some cases and the vault is permitted to descend downwardly in an uncontrolled manner rather than hand-cranking the vault lowering device, potentially causing damage to the vault or casket and/or potentially causing emotional stress for any family members who may remain at the graveside.

BRIEF SUMMARY OF THE INVENTION

The present invention provides an improved vault lowering device which requires no manual rotation or hand-cranking, is easily transportable with the vault accessories, and greatly reduces the time and effort required to raise or lower a vault.

In an embodiment, the invention comprises a vault lowering aid. In another embodiment, the invention comprises a vault lowering aid and handheld drill. In still another embodiment, the invention comprises a vault lowering system which includes a vault lowering device, a vault lowering aid, and a handheld drill.

BRIEF DESCRIPTION OF THE DRAWINGS

Figure 1:
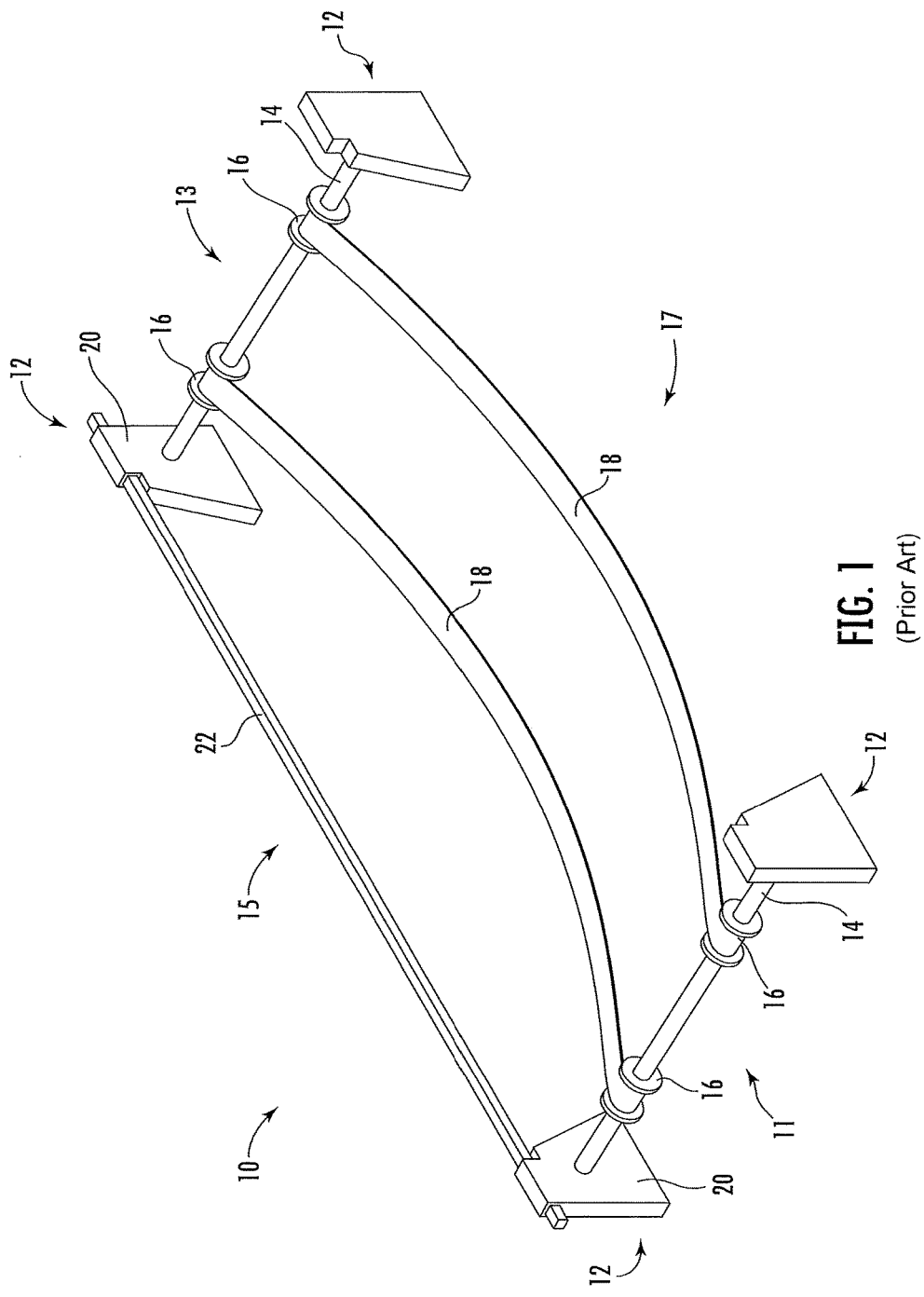

Having thus described the invention in general terms, reference will now be made to the accompanying drawings, which are not necessarily drawn to scale, and wherein:

FIG. 1 illustrates a conventional vault lowering device.

Figure 2:
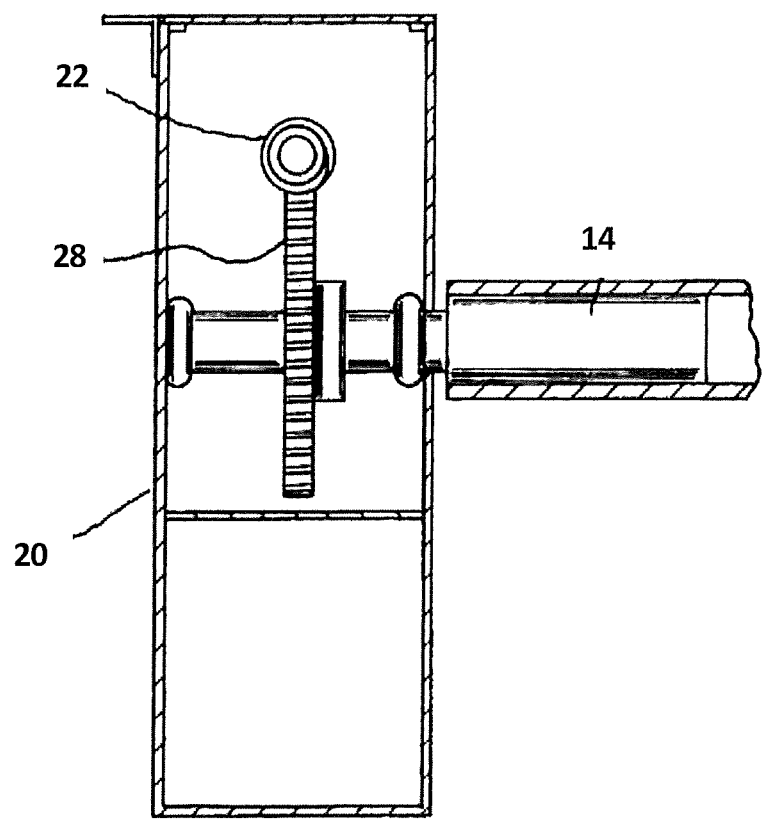

FIG. 2 is a front cross-sectional view of a conventional geared box.

Figure 3:
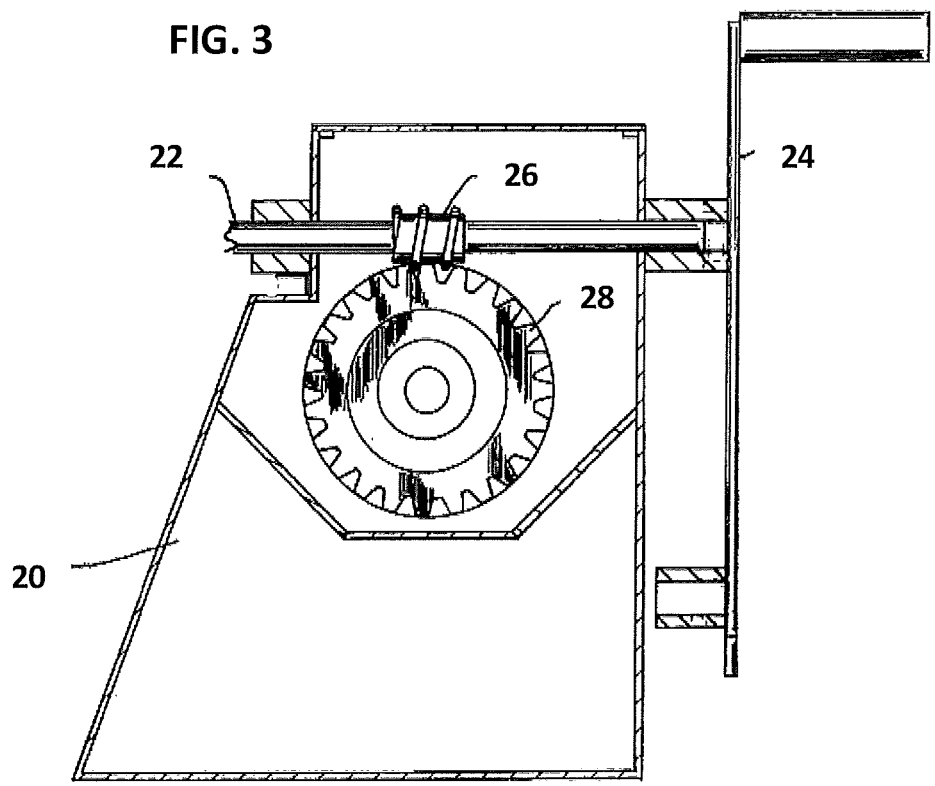

FIG. 3 is a side cross-sectional view of a conventional geared box.

Figure 4:
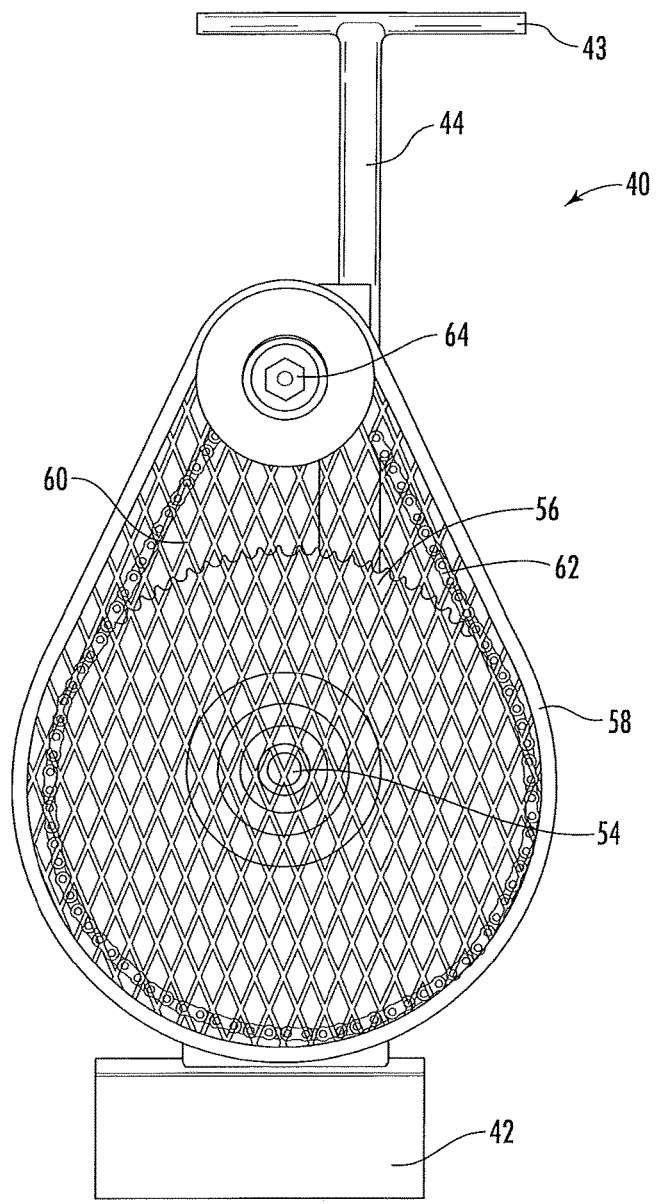

FIG. 4 is a front view of the vault lowering aid of the invention, in an embodiment.

Figure 5:
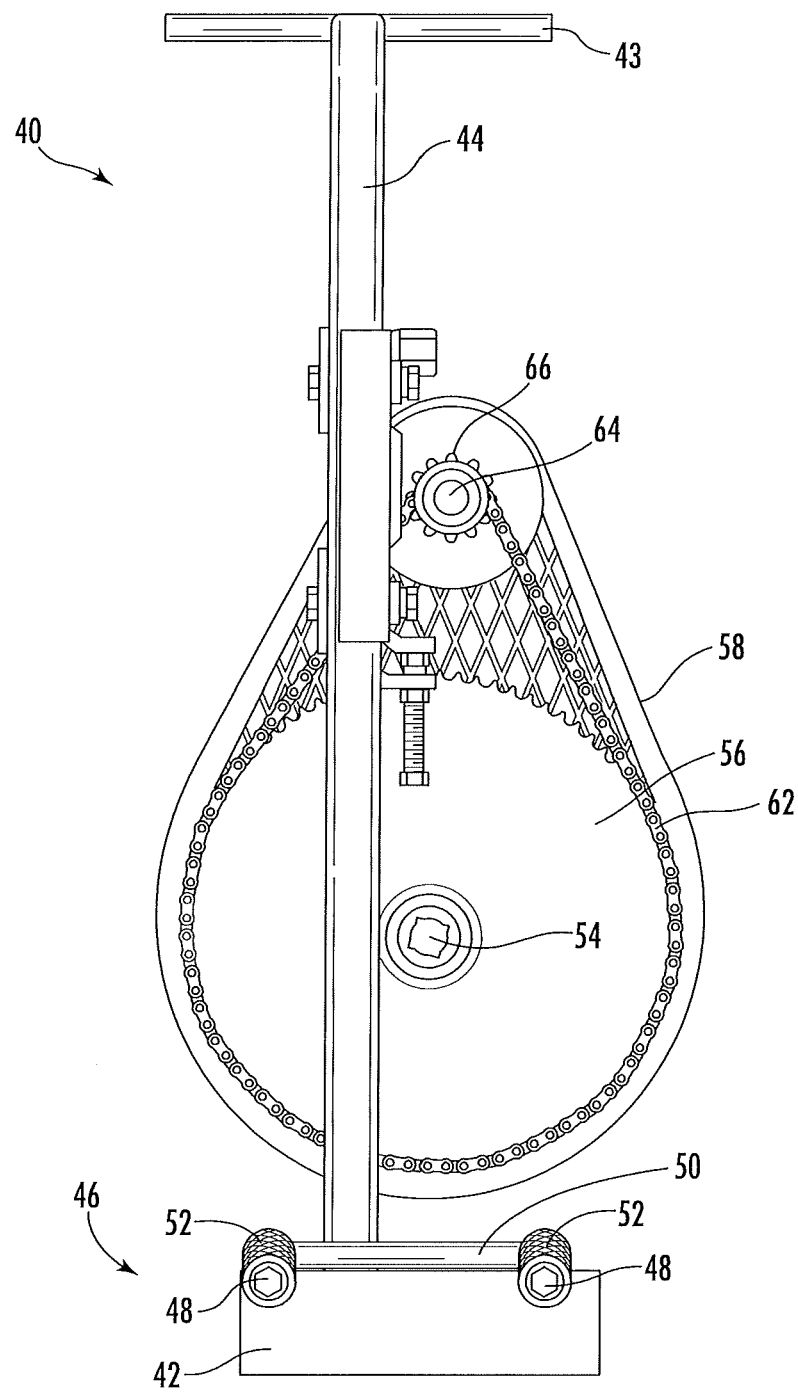

FIG. 5 is a rear view of the vault lowering aid of the invention, in an embodiment.

Figure 6:
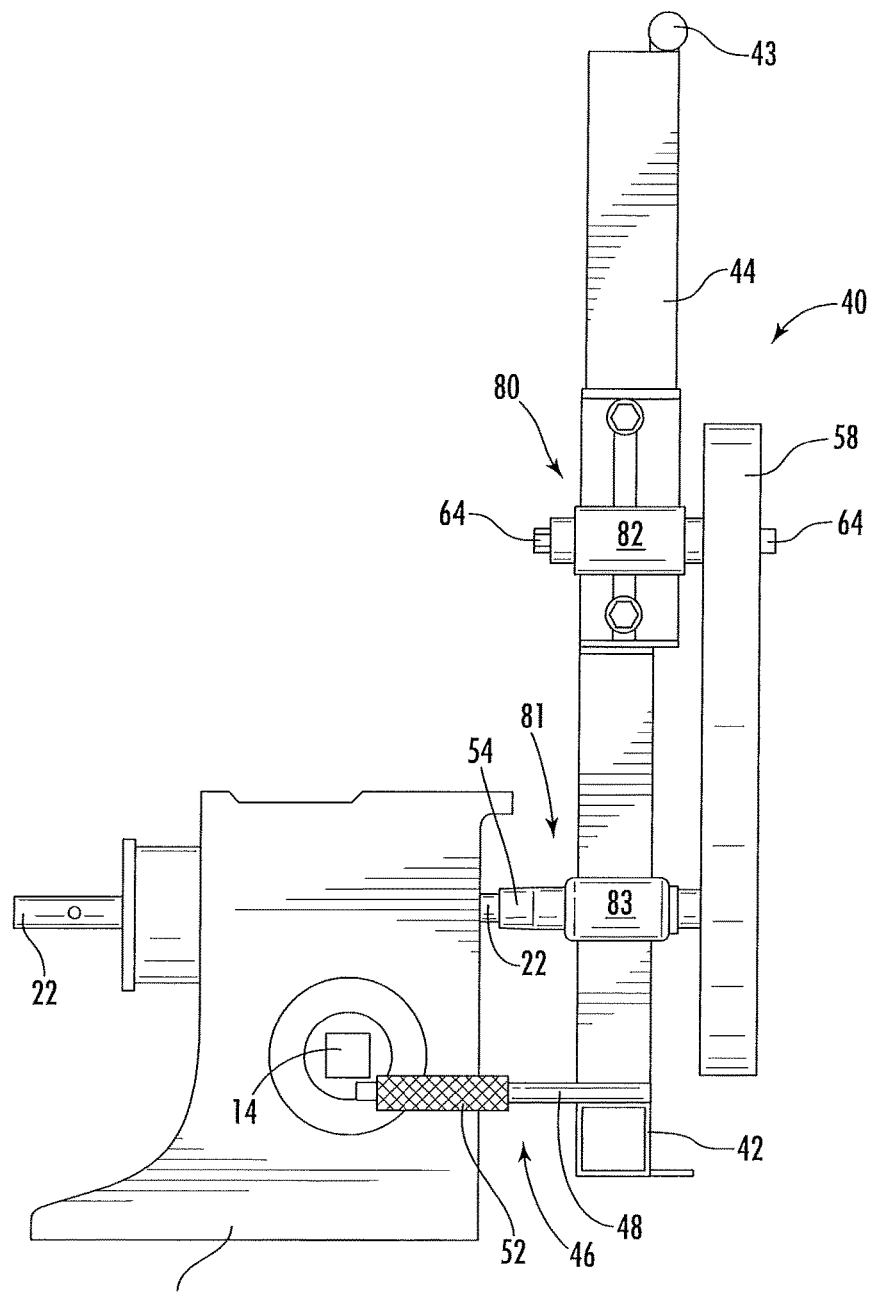

FIG. 6 is side view of the vault lowering aid of the invention as connected to the gear box, in an embodiment.

Figure 7:
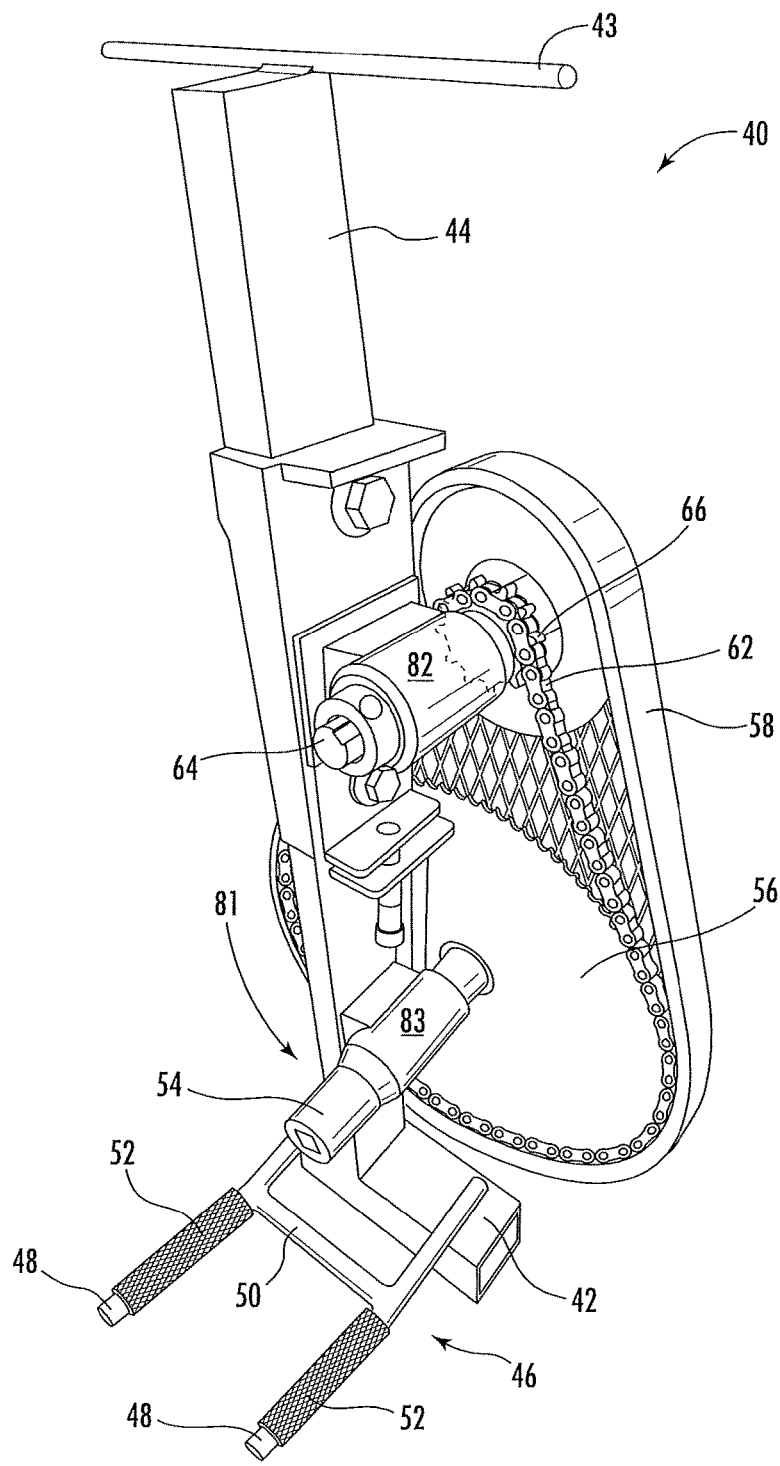

FIG. 7 is a rear perspective view of the vault lowering aid of the invention, in an embodiment.

DETAILED DESCRIPTION

Exemplary embodiments of the present invention now will be described more fully hereinafter with reference to the accompanying drawings, in which some, but not all embodiments of the invention are shown. Indeed, the invention may be embodied in many different forms and should not be construed as limited to the exemplary embodiments set forth herein; rather, these embodiments are provided so that this disclosure will satisfy applicable legal requirements. Like reference numerals refer to like elements throughout.

As shown in FIG. 1, a vault lowering device 10 may comprise a first end 11, a second end 13 opposite said first end 11, a first elongated side 15 and a second elongated side 17 opposite said first elongated side 15. The vault lowering device 10 may additionally comprise four pedestals 12 or corner posts.

Each pair of pedestals 12 may be connected to one another on the shorter ends of the vault (the first side 11 and the second side 13) by a rotating cable shaft 14 which comprises at least two cable spools 16. In an embodiment, the rotating cable shaft 14 may be elongated and tubular. In an embodiment, the rotating cable shaft 14 may have a cross-section which is circular, elliptical, oblong, square, triangular, hexagonal, octagonal, or any other shape known in the art. In an embodiment, the shape of the rotating cable shaft 14 is engageable with the hollow core of each cable spool 16. For example, if the rotating cable shaft 14 is square in cross-section, the inner surface of the hollow core of the cable spool 16 may also be square in cross-section.

In an embodiment, each cable spool 16 winds, unwinds and otherwise supports a cable 18. The cable 18 may be made from any material known in the art. The cable 18 should be strong and durable and capable of supporting the weight of a vault, casket, and the contents thereof. In an embodiment, the cable 18 may comprise a material made from or containing canvas, vinyl, nylon, polyester, leather, or any other material known in the art.

In an embodiment, a cable 18 is run from each cable spool 16 on one end of the vault, under the vault, and is connected to a respective cable spool 16 on the other rotating cable shaft 14. The pair of spools 16 may be locked onto cable shaft 14 by means of locks or stops or may be integral with cable shaft 14. In any case, the cable shaft 14 and the cable spools 16 may rotate together as one unit.

In an embodiment, one or more of the corner pedestals may comprise a geared box 20. FIGS. 2-3 illustrate an exemplary geared box 20 in cross-section. In an embodiment, one of each pair of pedestals 12 on the short ends of the vault will comprise a geared box 20, preferably the pedestals which are on the same side of the vault.

In an embodiment, each geared box 20 is connected to a non-geared pedestal 12, by means of the rotatable cable shaft 14. In an embodiment, the two geared boxes 20 may also be connected to each other via a rotatable shaft 22, which may be adjustable for any length burial vault. The rotatable shaft 22 engages with the gears of each of the gear boxes 20 and ensures that the gears of each geared box 20 move in unison. In an embodiment, the rotatable shaft 22 may be elongated and tubular. In an embodiment, the rotatable shaft 22, in cross-section, may be circular, oblong, elliptical, square, triangular, hexagonal, octagonal, or any other shape known in the art. In an embodiment, the shaft 22 comprises a square column or shaft. The shaft 22 may extend fully through each geared box 20, such that it extends outwardly past the edge of the geared box 20 on each end and simultaneously engages with the gears within the gear boxes 20. Alternatively, the shaft 22 may be configured such that it engages with a separate shaft contained within the gear box. For example, shaft 22 may have a socket configuration on each end and may receive the gear box shafts within each socket. In this configuration, as the first gear box shaft rotates, the shaft 22 also rotates and causes the second gear box shaft to rotate accordingly. In either embodiment, a portion of shaft 22 or the separate gear box shaft extends beyond the end of the geared box 20 opposite the shaft 22. The portion of shaft 22 (or the separate gear box shaft) that extends beyond the geared box 20 may be configured to receive a crank handle 24. That is, the extended portion of the shaft may be, in cross-section, circular, oblong, elliptical, square, triangular, hexagonal, octagonal, or any other shape known in the art. The crank handle 24, or inventive device discussed below, may have a similar engageable inner surface such that it fits within or outside the shaft and can be used to rotate the shaft.

As shown in FIG. 3, shaft 22 and, by extension, shafts 14, are conventionally controlled by a crank handle 24. In some embodiments, the crank handle 24 may be operated at either end of the apparatus on either geared box 20. One or more of the of the geared boxes 20 of the vault lowering device 10 typically accepts a removable handle 24 which, when rotated, imparts rotation to the shaft 22.

In an embodiment (shown in FIG. 3), the shaft 22 additionally comprises a helical screw 26 disposed about at least part of its circumference. The helical screw 26 may be configured to engage with the teeth of a gear 28 within the geared box 20. As the shaft 22 rotates, the helical screw 26 also rotates, turning the gear 28. In an embodiment, the center of the gear 28 is fixedly connected to one of the cable shafts 14. Thus, as the shaft 22 rotates, the helical screw 26 rotates, the gear 28 turns, and the cable shaft 14 turns accordingly. As the cable shaft 14 turns, the cable 18 is wound onto the cable spools 16 or unwound from the spools 16, thereby raising or lowering the vault respectively. Because shaft 22 is connected to the opposite geared box 20, it ensures the same rotation occurs at the other end of the vault.

Through ingenuity and hard work, the inventors have provided a device which can be utilized with the vault lowering devices described herein to improve the consistency of the lowering and raising process and to reduce the time and effort required to properly raise and lower a vault. Turning to FIG. 4, the inventive vault lowering aid 40 is shown. Generally speaking, the vault lowering aid 40 comprises a base 42 and an elongated bar 44 which is generally perpendicular to the base 42. The base 42 may be any of shape or configuration known in the art to provide a stable base for the vault lowering aid 40. In an embodiment, the base 42 is square or rectangular in shape.

At the top of the elongated bar 44, in an embodiment, is a carrying handle 43. The handle 43 may be used to carry the device 40 from location to location and may aid in the proper positioning of the device 40. The handle 43 may, in an embodiment, be disposed generally perpendicular to the elongated bar 44. The handle 43 may be integral with the elongated bar 44 or may be removable, in some embodiments.

Above the base 42, disposed on the elongated bar 44, is a guide and bumper assembly 46. The guide and bumper assembly 46 comprises two or more guide bars 48 which may be connected to one another by a stabilizing bar 50. The stabilizing bar 50 may be generally perpendicular to the guide bars 48.

The guide bars 48 are designed to guide the vault lowering aid 40 onto the gear box 20 and may rest on either side of the gear box 20. The guide and bumper assembly 46 may provide stabilization for the vault lowering aid 40 while it is attached to the gear box 20. Optionally, each of the guide bars 48 may have a bumper material 52 disposed about their circumference. The bumper material may be any material known in the art to reduce vibration, stabilize, or secure the vault lowering aid 40 on the gear box 20. In an embodiment, the bumper material 52 comprises a plastic, rubber, or thick fabric material. In a particular embodiment, the bumper material 52 may be comprised of tubing.

The elongated bar 44 additionally supports drive shaft 64 and driven shaft 54. In an embodiment, drive shaft 64 is disposed above driven shaft 54 on the elongated bar, but this configuration could be reversed. Each of drive shaft 64 and driven shaft 54 may be disposed within a support assembly 80, 81 which is integral with or affixed to the elongated bar 44, such as with bolts. In an embodiment, at least a portion of drive shaft 64 and driven shaft 54 is generally cylindrical. In this embodiment, the support assembly 80, 81 for each shaft may comprise a shaft housing 82, 83 that is generally cylindrical on its interior surface, such that each of the drive shaft 64 and the driven shaft 54 may rotate freely within each respective assembly. Each shaft assembly may also be configured to be attached to a housing 58. The shaft assemblies may be integral with or may be disposed to be affixed to the housing 58, such as with bolts.

In an embodiment, housing 58 is a front guard that is bolted to elongated bar 44. In an embodiment it is wholly independent of and removable from elongated bar 44. In such embodiment, if housing 58 is removed from the vault lowering aid 40, all elements contained within the housing 58 will remain affixed to the vault lowering aid 40 via connection to the elongated bar 44.

In an embodiment, each of the drive shaft 64 and driven shaft 54 interfaces with and engages with a separate sprocket contained within housing 58. In this embodiment, the drive shaft 64 is connected to or engaged with a drive sprocket 66, which is housed in housing 58. Similarly, the driven shaft 54 may be connected to and engage with a driven socket 56, which is also contained within the housing.

Speaking generally, one sprocket is larger than the other. While two sprockets are contemplated in the invention, it should be understood that additional sprockets and chains may be utilized as well. In an embodiment, the drive sprocket 66 is smaller than the driven sprocket 56. In an embodiment, the drive sprocket 66 comprises between approximately 8 and 14 teeth. In a particular embodiment, the drive sprocket 66 comprises approximately 11 teeth. In an embodiment, the drive sprocket 66 has an outside diameter of between about 1 inch and 2 inches. In a particular embodiment, the drive sprocket 66 has an outside diameter of about 1.5 inches.

In an embodiment, the driven sprocket 56 comprises between about 75 and 95 teeth. In a particular embodiment, the driven sprocket 56 comprises approximately 84 teeth. In an embodiment, the driven sprocket 56 has an outside diameter of between about 15 inches and 25 inches. In a particular embodiment, the driven sprocket 56 has an outside diameter of about 10.25 inches.

In an embodiment, the gear reduction ratio of the device 40 is between about 6:1 and 9:1. In another embodiment, the gear reduction ratio of the device 40 is between about 7:1 and 8:1.

In an embodiment, one or both of the shafts 64, 54 may have a notch, for example, that engages with a reciprocal notch on the respective sprocket 66, 56, such that they are respectively locked in configuration. In this embodiment, the drive shaft 64 rotates with and drives the rotation of the drive sprocket 66. Similarly, the driven shaft 54 rotates with and is driven by the rotation of the driven sprocket 56.

Drive sprocket 66 may, in an embodiment, be substantially smaller than driven sprocket 56. Drive sprocket 66 may be disposed above, below, or in any other configuration, in relation to driven sprocket 56. In an embodiment, drive shaft 64 is vertically aligned with driven shaft 54 and drive sprocket 66 is vertically aligned with driven sprocket 56. One or more spacers or collars may be used in connection with the respective shafts 64, 54 and/or sprockets 66, 56 in order to ensure a proper fit between the elongated bar 44, front guard 60, housing 58, shafts 64, 54, and/or sprockets 66, 56.

In an embodiment, a chain 62 is configured to connect and engage with the teeth of the driven sprocket 56 and the drive sprocket 66, allowing the drive sprocket 66 to drive the driven sprocket 56. Any chain 62 known in the art may be utilized, but in a particular embodiment, the chain may comprise a #35 chain. In an embodiment, at least the chain 62, driven sprocket 56, and drive sprocket 66 are contained within the housing 58.

In an embodiment, a portion of the drive shaft 64 extends from the elongated bar 44 through and beyond the housing 58 such that the shaft 64 is engageable on the front side of the housing 58. In this embodiment, the drive shaft 64 may have an exterior shape which is engageable with a socket. That is, the shaft 64 may be generally cylindrical within the shaft assembly and/or housing 58, but may be squared, elliptical, oblong, hexagonal, triangular, octagonal or any other shape in cross-section that may be engaged with a socket on the exterior of the housing 58. Alternatively, the drive shaft 64 may comprise a socket. For example, the shaft 64 may be hollow and may have an interior shape which is squared, elliptical, oblong, hexagonal, triangular, octagonal or any other shape in cross-section. The internal socket surface of the shaft 64 may be configured to be engaged with a matching shaft, bolt, screw, or other mechanism on the exterior of the housing 58.

Similarly, in an embodiment, a portion of the driven shaft 54 extends from the elongated bar 44, opposite the housing 58 and sprocket 56, such that the shaft 54 is engageable with the shaft 22 of the geared box 20. In this embodiment, the driven shaft 54 may be generally cylindrical within the shaft assembly and may comprises a hollow shaft, configured and disposed such that it fits onto the end of the rotatable shaft 22 of the geared box 20. That is, if the rotatable shaft 22 concludes in a square configuration, the internal surface of the driven shaft 54 will have a square configuration of substantially the same size as that of the shaft 22. In some embodiments, the driven shaft 54 may comprise a socket that is adapted to fit the rotatable shaft 22. Likewise, the driven shaft 54 may be configured such that it has an exterior shape which fits within a socket of the shaft 22. In any embodiment, the driven shaft 54 is engaged with the shaft 22 of the gear box 20 such that it may rotate the shaft 22.

As noted, at least the sprockets 56, 66 and the chain 62 are contained within a housing 58 and/or front guard 60. The housing 58 may have an elongated or oblong shape configured to house the components of the vault lowering aid 40. For example, the lower portion of the housing 58 may be generally rounded and may be sized to house the larger driven sprocket 56. The upper portion of the housing 58 may also be generally rounded but may be smaller in size, adapted for the smaller drive sprocket 66. Thus, the housing 58 may appear to have an egg-shaped configuration.

The housing 58 may have a front guard 60 disposed on the front side of the vault lowering aid 40. In an embodiment, the housing 58 and the front guard 60 are one unitary element and cannot be separated from one another. In an embodiment, the housing 58 and/or front guard 60 may include one or more braces that secure the housing 58 and/or front guard 60 to elongated bar 44, for example near the top and bottom of the housing 58 and/or front guard 60.

The front guard 60 may be disposed to protect the internal mechanisms and/or prevent the accidental insertion of fingers or other objects into the vault lowering aid 40 while it is being operated. The front guard 60 may be solid or may comprise a netted or hatched pattern. In an embodiment, the housing 58 may additionally comprise a back guard which may be disposed to protect the internal mechanisms and/or prevent the accidental insertion of fingers or other objects into the vault lowering aid 40 while it is being operated. The back guard may be solid or may comprise a netted or hatched pattern. The front guard 60 and back guard (not shown) may surround the driven sprocket 56, drive sprocket 66, chain 62 and other components of the housing 58.

In an embodiment, the invention additionally comprises a handheld socket drill and/or an adapter to convert a standard handheld drill/driver into a socket drill for use with the inventive vault lowering aid 40. The drill or adapter for the drill should be configured to receive the engageable end of the drive shaft 64, disposed on the front side of the housing 58, and rotate the drive shaft 64. In an embodiment, the drill is battery operated and rechargeable.

Operation

In operation, a user affixes the vault lowering aid 40 to the geared box 20. The driven shaft 54 is fitted over the rotatable shaft 22 of the geared box 20, such that when the driven shaft 54 rotates, the rotatable shaft 22 also rotates. The guide and bumper assembly 46 are fitted over the geared box 20 as well. The two guide bars 48 rest on either side of the gear box 20. Optionally, the vault lowering aid 40 is locked into position.

The user then uses a handheld drill/driver with a socket to engage the front end of the drive shaft 64. As the user operates the drill, the drive shaft 64 is rotated clockwise or counterclockwise, depending on the direction in which the user desires to move the vault. As the drive shaft 64 rotates due to the force of the socket drill, the engaged drive sprocket 66 also turns, engaging and turning the chain 62. As the chain 62 turns, it engages the teeth of driven sprocket 56 and rotates driven sprocket 56. As driven sprocket 56 turns, it engages and rotates driven shaft 54. Because driven shaft 54 is fitted over and fixedly engaged with rotatable shaft 22, it turns rotatable shaft 22 and operates the vault lowering device 10.

CONCLUSION

Many modifications and other embodiments of the inventions set forth herein will come to mind to one skilled in the art to which these inventions pertain having the benefit of the teachings presented in the foregoing descriptions and the associated drawings. Therefore, it is to be understood that the embodiments of the invention are not to be limited to the specific embodiments disclosed and that modifications and other embodiments are intended to be included within the scope of the invention. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the invention. In this regard, for example, different combinations of elements and/or functions than those explicitly described above are also contemplated within the scope of the invention. Although specific terms are employed herein, they are used in a generic and descriptive sense only and not for purposes of limitation.

That which is claimed:

1. A vault lowering aid comprising:
    a housing;
    an elongated member;
    a drive shaft assembly affixed to the elongated member and the housing, wherein the drive shaft assembly receives a drive shaft therethrough, and wherein the drive shaft extends outwardly of the housing, opposite the elongated member;
    a drive sprocket disposed within the housing and engaged with the draft shaft, such that a rotation of the draft shaft causes a rotation of the drive sprocket;
    at least one driven sprocket disposed within the housing and engaged with the drive sprocket via a chain, wherein the chain is disposed within the housing and engaged with teeth of the drive sprocket and the driven sprocket, and enables the rotation of the drive sprocket to cause a rotation of the driven sprocket;
    a driven shaft assembly affixed to the elongated member and the housing, wherein the driven shaft assembly receives a driven shaft therethrough, wherein the driven shaft is engaged with the driven sprocket, such that the rotation of the driven sprocket causes the rotation of the driven shaft, and wherein the driven shaft engages a vault lowering device geared box; and
    at least one guide mechanism securing the vault lowering aid on the geared box.

2. The vault lowering aid of claim 1, wherein the portion of the drive shaft which is disposed outwardly of the housing is configured to engage with a drill/driver with a socket.

3. The vault lowering aid of claim 1, wherein the drive sprocket is disposed above the driven sprocket, within the housing.

4. The vault lowering aid of claim 1, wherein the drive shaft is disposed above the driven shaft, on the elongated member.

5. The vault lowering aid of claim 1, additionally comprising a handle disposed on the elongated member.

6. The vault lowering aid of claim 1, additionally comprising a base member disposed on the elongated member.

7. The vault lowering aid of claim 1, wherein the housing additionally comprises a front guard.

8. The vault lowering aid of claim 1, wherein the housing additionally comprises a rear guard.

9. The vault lowering aid of claim 1, wherein the guide mechanism comprises at least two members configured to be secured onto opposite sides of the geared box.

10. The vault lowering aid of claim 9, wherein the at least two members comprise a cushioning material selected from the group consisting of a plastic, rubber, or cloth material.

11. The vault lowering aid of claim 1, wherein the gear reduction ratio of the aid is between about 6:1 and 9:1.

12. The vault lowering aid of claim 1, wherein the gear reduction ratio of the aid is between about 7:1 and 8:1.

13. The vault lowering aid of claim 1, wherein the drive sprocket has between approximately 8 and 14 teeth.

14. The vault lowering aid of claim 1, wherein the drive sprocket has approximately 11 teeth.

15. The vault lowering aid of claim 1, wherein the driven sprocket has between about 75 and 95 teeth.

16. The vault lowering aid of claim 1, wherein the driven sprocket has approximately 84 teeth.

17. A vault lowering aid comprising:
    a housing;
    a drive shaft assembly affixed to the housing, wherein the drive shaft assembly receives a drive shaft therethrough, and wherein the drive shaft extends outwardly of the housing on at least one side of the housing;
    a drive sprocket disposed within the housing and engaged with the draft shaft, such that a rotation of the draft shaft causes a rotation of the drive sprocket;
    at least one driven sprocket disposed within the housing and engaged with the drive sprocket via a chain, wherein the chain is disposed within the housing and engaged with teeth of the drive sprocket and the driven sprocket, and enables the rotation of the drive sprocket to cause a rotation of the driven sprocket;
    a driven shaft assembly affixed to the housing, wherein the driven shaft assembly receives a driven shaft therethrough, wherein the driven shaft is engaged with the driven sprocket, such that the rotation of the driven sprocket causes the rotation of the driven shaft, and wherein the driven shaft engages a vault lowering device geared box; and
    at least one guide mechanism securing the vault lowering aid on the geared box.

18. The vault lowering aid of claim 17, wherein the drive shaft extends outwardly of the housing on both sides of the housing.

19. The vault lowering aid of claim 17, wherein the gear reduction ratio of the aid is between about 7:1 and 8:1.

20. A method of using the vault lowering aid of claim 17, comprising:
    providing the geared box of the vault lowering device;
    engaging the driven shaft of the vault lowering aid with a shaft of the geared box;
    securing the guide mechanism on both sides of the geared box;
    engaging the portion of the drive shaft which extends outwardly of the housing with a drill/driver with a socket; and
    using the drill/driver, rotating the drive shaft clockwise or counterclockwise.

* * * * *

UNITED STATES PATENT AND TRADEMARK OFFICE
CERTIFICATE OF CORRECTION

PATENT NO. : 10,258,530 B1
APPLICATION NO. : 16/057123
DATED : April 16, 2019
INVENTOR(S) : Anderson et al.

Page 1 of 1

It is certified that error appears in the above-identified patent and that said Letters Patent is hereby corrected as shown below:

In the Claims

Column 7, Claim 1, Lines 26-27:
"with the draft shaft, such that a rotation of the draft shaft"
Should read:
-- with the drive shaft, such that a rotation of the drive shaft --

Column 8, Claim 17, Lines 25-26:
"with the draft shaft, such that a rotation of the draft shaft"
Should read:
-- with the drive shaft, such that a rotation of the drive shaft --

Signed and Sealed this
Fifteenth Day of March, 2022

Drew Hirshfeld
*Performing the Functions and Duties of the*
*Under Secretary of Commerce for Intellectual Property and*
*Director of the United States Patent and Trademark Office*